United States Patent
Bazza et al.

(10) Patent No.: US 12,435,161 B2
(45) Date of Patent: Oct. 7, 2025

(54) PROCESS FOR DIRECT SULFATION OF POLYSACCHARIDES IN AN ECOLOGICALLY ACCEPTABLE SOLVENT

(71) Applicant: LESAFFRE ET COMPAGNIE, Paris (FR)

(72) Inventors: Paola Bazza, Desio (IT); Davide Bianchi, Desio (IT); Auro Roberto Tagliani, Desio (IT)

(73) Assignee: LESAFFRE ET COMPAGNIE, Paris (FR)

( * ) Notice: Subject to any disclaimer, the term of this patent is extended or adjusted under 35 U.S.C. 154(b) by 565 days.

(21) Appl. No.: 17/905,337

(22) PCT Filed: Mar. 2, 2021

(86) PCT No.: PCT/IB2021/051714
§ 371 (c)(1),
(2) Date: Aug. 31, 2022

(87) PCT Pub. No.: WO2021/176341
PCT Pub. Date: Sep. 10, 2021

(65) Prior Publication Data
US 2023/0090768 A1    Mar. 23, 2023

(30) Foreign Application Priority Data
Mar. 4, 2020  (IT) .................. 102020000004564

(51) Int. Cl.
*C08B 37/00* (2006.01)
(52) U.S. Cl.
CPC ...... *C08B 37/0063* (2013.01); *C08B 37/0069* (2013.01); *C08B 37/0075* (2013.01)
(58) Field of Classification Search
CPC .......... C08B 37/0069; C08B 37/0063
See application file for complete search history.

(56) References Cited

U.S. PATENT DOCUMENTS 9,175,293 B2    11/2015  Doherty et al.

FOREIGN PATENT DOCUMENTS

| CN | 101230109 A | 7/2008 |
| EP | 0214879 B1 | 3/1987 |
| EP | 3279220 B1 | 2/2018 |
| GB | 773477 A | 4/1957 |
| JP | S6227402 A | 2/1987 |
| JP | 2013520995 A | 6/2013 |
| JP | 2017048404 A | 3/2017 |
| WO | 2012130753 A1 | 10/2012 |

OTHER PUBLICATIONS

Chauvelon et al., Carbohydrate Research, 2003, 338, p. 743-750. (Year: 2003).*
Search Report and Written Opinion of PCT/IB2021/051714 of May 26, 2021.
Letter dated Dec. 20, 2024 from Japanese Associate reporting Office Action issued Dec. 10, 2024 in connection with Japanese Patent Application No. 2022-552532.
Office Action issued Dec. 10, 2024 in connection with counterpart Japanese Patent Application No. 2022-552532.
English translation of Office Action issued in counterpart Chinese Patent Application No. 202180017984.2 issued Sep. 1, 2023.
Letter reporting office action issued Sep. 1, 2023 in connection with counterpart Chinese Patent Application No. 202180017984.2.

* cited by examiner

*Primary Examiner* — Jonathan S Lau
(74) *Attorney, Agent, or Firm* — Silvia Salvadori, P.C.; Silvia Salvadori

(57) ABSTRACT

The invention relates to a novel process for obtaining direct sulfation of unprotected sugars, in particular polysaccharides, using ecologically acceptable solvents.

10 Claims, No Drawings

PROCESS FOR DIRECT SULFATION OF POLYSACCHARIDES IN AN ECOLOGICALLY ACCEPTABLE SOLVENT

This application is a U.S. national stage of PCT/IB2021/051714 filed on 2 Mar. 2021, which claims priority to and the benefit of Italian Patent Application No. 102020000004564 filed on 4 Mar. 2020, the contents of which are incorporated herein by reference in their entireties.

FIELD OF INVENTION

The invention relates to a novel sulfation process, in particular sulfation of sugars, using ecologically acceptable solvents; the method is also applicable to polysaccharides, and allows the preparation of sulfated glycosaminoglycans such as chondroitin sulfate. Reactions of this type are generally conducted in toxic solvents with a high environmental impact, such as dimethylformamide, dimethylacetamide and the like. A previously unknown discovery is that the sulfation reaction can be conducted in acetic acid, an ecologically acceptable solvent, giving rise to good conversion yields, good control of the degree of sulfation, and good chemoselectivity. Moreover, the method does not require hydroxyl group protection/deprotection steps but can be applied directly to unprotected sugars. It is also applicable to polysaccharides, in a wide range of molecular weights. In particular, it can be applied to glycosaminoglycans and can be useful in the preparation of heparin, keratan sulfate, dermatan sulfate and chondroitin sulfate.

BACKGROUND OF THE INVENTION

Glycosaminoglycans (GAGs, or mucopolysaccharides) are a family of polysaccharides formed by a straight chain of disaccharides that alternate a simple sugar with an amino sugar; one or more sulfate groups can be present on the disaccharide, in various positions. They are present in many animal tissues, and particularly abundant in connective tissue, such as skin, cartilage and soft tissues in general. GAGs include heparin and heparan sulfate, chondroitin sulfate, dermatan sulfate, keratan sulfate and hyaluronic acid; the latter is the only one with no sulfate groups. Glycosaminoglycans can have different sulfation profiles and different molecular weights, depending on the animal species and the organ or tissue of origin.

Chondroitin sulfate is a glycosaminoglycan consisting of N-acetylglucosamine and glucuronic acid, present in sulfate groups in various positions on the disaccharide, and is generally present in various animal tissues; it is the most abundant GAG in humans, where it is found in cartilage in particular. It is currently used, both as an injectable drug and as a nutraceutical product, in the treatment of osteoarthritis and other inflammatory joint disease, in particular of the knee and hand, for both human and veterinary use.

CS is usually obtained as a by-product of the food industry, in particular from breeding animals such as cattle and pigs, or from the fishing industry, in particular from sharks. Depending on the tissue and the species of origin, chondroitin sulfate has different characteristics, in particular with a different sulfation profile and a different molecular weight; the latter can also be influenced by the preparation method used. CS can be classified on the basis of the sequence of disaccharides of which it consists; the sulfate group can be present in different positions on the disaccharides and on both sugars (mainly in the 2, 4 and 6 positions); chondroitins A and C have only one sulfate group, whereas B, E and D have two sulfate groups. Non-sulfated and trisulfated chondroitins may also be present.

The composition of the CS of animal origin present on the market differs according to the species and tissues of origin; the molecular weight is also different, generally being higher in products of marine origin and lower in those obtained from land animals. Moreover, CS of animal origin presents as a very heterogeneous mixture in terms of the molecular weight of the polymers, as it consists of a mixture of short-chain (a few kDa), medium-chain and long-chain (>100 kDa) polysaccharides. To describe the characteristics of CS, its polydispersity (dispersion of MW values around the average) is also indicated in addition to the average MW value. A description of the composition by product origin will be found in WO2012/159655, pp. 2-3, Table 1.

The average original molecular weight of CS (or other glycosaminoglycans) can also be reduced at will by controlled fragmentation of the polysaccharide; in CS of animal origin with a low average molecular weight (LMW-CS), the polydispersity value is generally even higher, as the polysaccharide chains are fragmented randomly in both acid and radical hydrolysis.

In addition to poor standardisation of the product, the fact that CS is of animal origin obviously also involves other risks, such as those associated with diseases transmissible from the originating animal to humans or pets.

To overcome the drawbacks deriving from animal origin, production of chondroitin sulfate obtained by semisynthesis was recently developed; a non-sulfated precursor called K4 is produced by fermentation, and subsequently converted to chondroitin sulfate. K4 is a polysaccharide which has the same linear structure as chondroitin, but also carries fructose residues and does not have sulfate groups; it can be produced by fermentation, for example from *E. coli* 05:K4:H4, as disclosed in WO2001/02597A1. K4 can easily be defructosylated by chemical hydrolysis, giving rise to a linear polymer called K4d, corresponding to the structure of non-sulfated chondroitin, and CS is obtained from this.

Alternatively, K4d polysaccharide can also be produced directly by fermentation, using a suitable recombinant microbial strain, as described in WO2012/004063.

Subsequent sulfation of K4d polysaccharide can take place under controlled conditions to modulate the degree of sulfation (number of sulfate groups per disaccharide unit) in terms of the position of introduction of the sulfate group, generally in the 4 position or the 6 position. The molecular weight can also be modulated, for example by subjecting a high-molecular-weight polymer to acid or radical hydrolysis; this can be done either before or after sulfation, i.e. on both the K4d polysaccharide and the chondroitin sulfate. This process, with its variants, gives rise to a chondroitin sulfate having the desired sulfation profile, with excellent reliability and without the drawbacks characteristic of a product of animal origin (US2019/231810).

The sulfation reaction of K4d polymer has so far been conducted with various sulfating agents, but always using an anhydrous organic solvent, in particular dimethylformamide (DMF); it is not a low eco-toxicological impact process.

DMF is a solvent that requires special precautions because it is not only inflammable but also dangerous to humans and the environment; it is toxic to the skin and eyes, the respiratory system and the reproductive system. It is also particularly dangerous because it is harmful if it comes into contact with the skin or is inhaled. In view of its toxicity characteristics, the environmental costs are obviously also high; recovery and disposal of wastewater containing DMF is expensive. Dimethylacetamide or N-methyl pyrrolidone can be used in sulfation reactions as an alternative to DMF, but they present similar eco-toxicological problems.

DMF is also a good solvent for sulfating agents; for example, in Chopin et al., *BioMed Research International* 2015, Article ID508656, a glycosaminoglycan is sulfated using ionic liquids as reaction solvent, but DMF is still used to dissolve the sulfate group donors ($SO_3$ complexes with various organic bases). Moreover, DMF forms a complex with $SO_3$ which constitutes a possible sulfating agent.

As an alternative to DMF, acetonitrile can be used as solvent in reactions conducted with microwave radiation; see, for example, de Paz Carrera et al., WO2012/035188. A general description of the sulfation reactions of organic molecules, including polysaccharides, will be found in the review by Desai et al., *Tetrahedron* 66, 2907-18 (2010).

Definitions

K4: fructosylated, non-sulfated glycosaminoglycan polysaccharide, having the following structural formula:

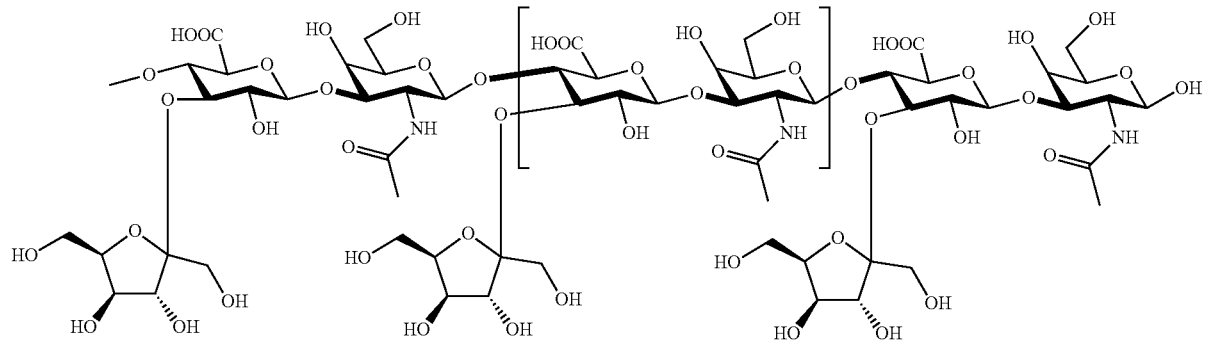

K4d: non-sulfated glycosaminoglycan polysaccharide free from fructose residues, having the following structural formula:

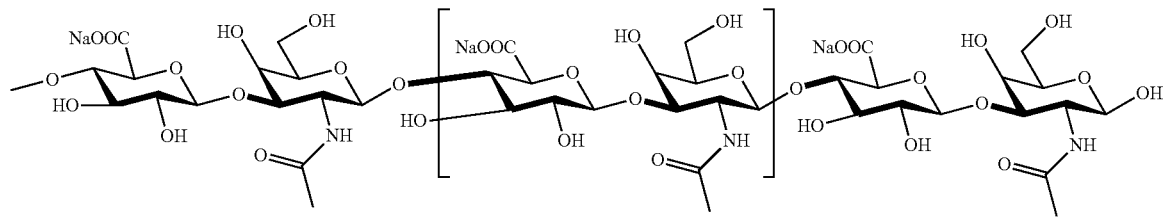

Chondroitin sulfate: sulfated glycosaminoglycan polysaccharide, having the following structural formula:

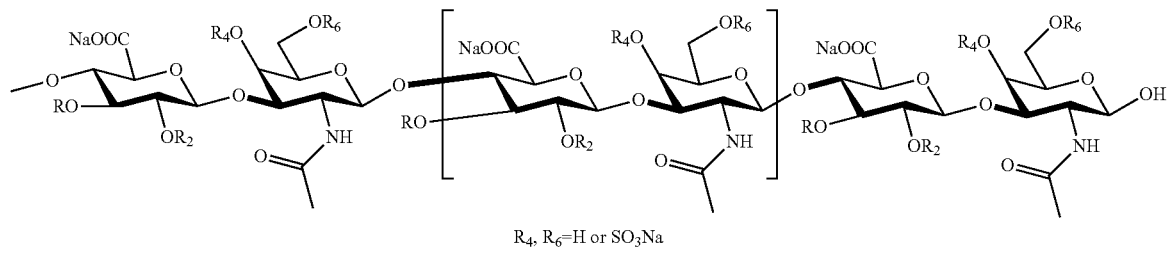

$R_4$, $R_6$=H or $SO_3Na$

DESCRIPTION OF THE INVENTION

The sulfation process of the invention allows the use of acetic acid, an ecologically acceptable solvent, while maintaining good control over the reaction in terms of both its progression, i.e. the degree of sulfation, and the position of introduction of the sulfate group, namely its selectivity. Moreover, the process does not require protection and deprotection steps, resulting in raw material savings and lower wastewater production. The process involves an increase in molecular weight (MW) which is solely associated with the introduction of new sulfate groups but does not affect the polymer length, or only influences it in a controlled way, and in particular does not generate fragmentation; if LMW-CS is required, the MW of the end product can therefore be modulated at will by combining synthesis processes (controlled fragmentation of K4d polysaccharide, before or after sulfation, on chondroitin sulfate) and isolation processes (isolation by precipitation or ultrafiltration). The novel process therefore produces a CS having the desired sulfation profile, molecular weight and polydispersity which is suitable for use in the nutritional and pharmaceutical fields.

The process of the invention has a lower ecological impact due to the use of non-polluting solvents and lower wastewater production. In the preferred embodiment of the process, the resulting product is the sodium salt of low-molecular-weight chondroitin sulfate.

In one possible embodiment, a K4d polymer salt, preferably a tetraalkylammonium salt, more preferably pyridinium salt or a tetramethyl-, tetraethyl- or tetrabutyl-ammonium salt, is sulfated. In an alternative embodiment, K4d polysaccharide in acid form is used.

In one embodiment, a complex of $SO_3$ with an organic base, such as $SO_3Py$ or $SO_3NEt_3$, DMF, etc., is used as sulfating agent. In an alternative embodiment, chlorosulfonic acid is used as sulfating agent.

In one embodiment, the sulfation reaction is conducted using acetic acid as solvent.

The process of the invention comprises:
a) dissolving or suspending a polysaccharide, such as a glycosaminoglycan or a salt thereof, in acetic acid,
b) adding a sulfating agent,
c) conducting the reaction under controlled temperature conditions, for example by maintaining the reaction mixture between the freezing temperature of acetic acid or its mixtures with the polysaccharides to be sulfated and 70° C., more preferably between 10 and 50° C., and even more preferably between 10 and 20° C.,
d) separating the product from the reaction solvent, for example by direct filtration, precipitation in organic solvent, or chromatography,
e) optionally, removing organic or inorganic salts and other impurities from the glycosaminoglycan sulfate solution, for example by dialysis,
f) optionally, recovering the reaction solvent obtainable after separation of the desired product, and reusing it in the reaction described in point a).

A solution of the desired product is thereby obtained in a sufficiently pure form for use in the nutritional field; if it is desired to obtain the product in solid form, the solution can be freeze-dried, spray-dried or dried by another suitable process.

If a reaction product of a quality suitable for injectable use is to be obtained, it is advisable to remove any pyrogens from the above solution, for example by depyrogenation with carbon, followed by sterilising filtration before drying.

The complete process starts with production of capsular polysaccharide K4, obtained by fermentation of wild-type *Escherichia coli* strain 05:K4:H4 as disclosed in WO2001/02597A1. After separation of the biomass, the supernatant is subjected to hydrolysis under controlled conditions to remove the fructose residues; an aqueous solution of K4d polysaccharide is obtained, which corresponds to a non-sulfated chondroitin. Said product can be further purified, to obtain an aqueous solution of defructosylated high-molecular-weight polysaccharide in the form of sodium salt. This product is then subjected to controlled fragmentation in acidic conditions, similarly to the process described by Cho et al. in *Biol Pharm Bull* 27, (1), 47-51. Alternatively, a radical fragmentation process can be employed, using hydrogen peroxide and iron sulfate as disclosed in IT 1224260, or using sodium hypochlorite as disclosed in U.S. Pat. No. 4,977,250. The reaction is usually monitored by HPLC-SEC to control the molecular weight of the product; when the desired average MW, for example between 5 and 30 kDa, has been reached, the reaction is quenched by adding sodium hydroxide, sodium carbonate or another base until a neutral pH is reached, and the mixture is cooled to room temperature.

The aqueous solution of low-molecular-weight K4d polymer is subjected to ultrafiltration with polysulfone membranes with a cut-off between 500 and 5000 Daltons; the inorganic salts (mainly sodium chloride and sodium sulfate) and sugars with a very low molecular weight are eliminated in the permeate. In this way the molecular weight of the polymer is selected in a narrow range; it is also possible to combine two ultrafiltrations, one with a higher cut-off and one with lower cut-off, to further narrow the distribution of the molecular weights (low polydispersity).

The fraction of high-molecular-weight polymer trapped by the membrane can be recycled in the next batch.

To obtain K4d polysaccharide as sodium salt, the solution can be concentrated by ultrafiltration or thin-film evaporation, and then spray-dried; alternatively, the product can be isolated by freeze-drying. Substantially pure K4d polysaccharide (non-sulfated chondroitin) having the desired molecular weight is obtained; the residual water content is less than 5% and typically less than 2% (Karl-Fischer titration).

Using a procedure very similar to the one described above, a potassium, ammonium or other salt can be obtained by using the appropriate solutions for dialysis or elution from resins (for example, by using a solution of KCl instead of NaCl).

To obtain K4d polymer in acid form or as quaternary ammonium salt it is possible to operate as described above but, to reduce costs, it is preferable to use a cation-exchange resin, preferably a strong acid resin, and preferably a sulfonic acid resin. The resin can be based on a natural polymer such as agarose, or on a synthetic polymer such as a polyacrylate or polystyrene; it can be either rigid or in gel form; it must be functionalised with a strong acid group, such as a sulfonic or phosphoric group. The process can be conducted in column or batch mode, and the amount of resin to be used depends on its degree of functionalisation (number of functional groups per litre of resin).

The aqueous solution of K4d polymer is treated in a reactor fitted with mechanical stirrer by adding the resin (in acid form) in successive portions until the pH of the solution is less than 2; the resin is then separated by filtration. A solution of K4d polysaccharide in the form of undissociated acid is obtained, no polymer fragmentation being observed;

the product can also be obtained in solid form by freeze-drying or spray-drying the solution.

If the product is to be obtained in the form of a quaternary ammonium salt, a suitable base (pyridine, tetrabutylammonium hydroxide, etc.) is added to the acid solution described above in the amount required to reach a neutral pH; the solid product is obtained by spray-drying as described above, or by freeze-drying.

The pyridinium, tetramethylammonium, tetraethylammonium and tetrabutylammonium salts can be obtained in this way, all in the form of a white or pale yellow solid, with residual moisture less than 5% and substantially free from sodium (less than 0.1%).

The K4d polymer in acid or salified form is then used for the sulfation reaction described below, to obtain chondroitin sulfate; after dialysis and concentration, the CS solution is spray-dried to obtain CS sodium salt. The good control of the reaction enables the regioselectivity and degree of sulfation of the polymer to be modulated. In this way, it is possible to prepare a product having characteristics similar to those of chondroitin sulfate of animal origin, for example with a sulfation profile similar to CS obtained from sharks or other animal species.

It is also possible to select the average molecular weight of the end product and its distribution around the average value either by fragmenting the K4d polymer before sulfation, as described above, or fragmenting the chondroitin sulfate obtained after sulfation; in both cases fragmentation can be obtained by an acid or radical mechanism, as described in the literature cited.

The following examples illustrate the invention in greater detail.

Example 1: General Procedure for Preparation of K4d Polymer Sodium Salt

K4d polysaccharide is obtained by producing capsular polysaccharide K4 by fermentation of *Escherichia coli* as described in Manzoni et al., Biotechnol Lett 18, 383-6 (1996); after separation of the biomass, the supernatant is subjected to hydrolysis under controlled conditions to remove the fructose residues; the resulting aqueous solution of K4d polysaccharide is further purified by chromatography as described in Rodriguez et al., *Eur J Biochem* 177, 117-124 (1988), to obtain an aqueous solution of defructosylated high-molecular-weight polysaccharide.

An acid depolymerisation under controlled conditions is then carried out, adjusting the solution to a pH ranging between 1 and 4 by addition of HCl, and heating to 60-80° C. The reaction is monitored by HPLC-SEC to check the molecular weight of the product; when the desired average molecular weight of between 5 and 30 kDa has been reached, the reaction is quenched by adding sodium hydroxide until pH 7 is reached, and cooled to 20-25° C.

The aqueous solution of low-molecular-weight K4d polymer is subjected to ultrafiltration with polysulfone membranes having a 2.5 kDa cut-off, dialysed with water and concentrated. On an industrial scale, the product is isolated by spray-drying, while on a laboratory scale it is obtained by freeze-drying. K4d polysaccharide (non-sulfated chondroitin) sodium salt is obtained as a fine whitish powder; the residual water content is less than 2% (Karl-Fischer titration).

Example 2: General Procedure for the Preparation of K4d Polymer Quaternary Ammonium Salt K4d polysaccharide is obtained by operating as described in Example 1 until the aqueous solution of pure sodium salt is obtained, with the desired molecular weight, with no need to isolate the product in solid form.

Said solution is placed in a reactor fitted with a mechanical stirrer, and Amberlite IRA1200H resin (acid form) is then added in successive portions, until a pH below 2 is reached; the resin is then separated by filtration. A solution of K4d polysaccharide in undissociated acid form is obtained, no polymer fragmentation being observed; the product can also be obtained in solid form by freeze-drying or spray-drying the solution.

A similar resin can be used instead of Amberlite IRA1200H, such as a strong cationic resin with a polyacrylic or polyvinyl structure, and similar results will be obtained.

A base (pyridine or tetrabutyl-, tetramethyl- or tetraethylammonium hydroxide) is added to said acid solution in the amount required to reach a pH value greater than 7. The solid product is obtained by spray-drying or freeze-drying.

The pyridinium, tetramethylammonium, tetraethylammonium or tetrabutylammonium salts are obtained in this way, all in the form of a white or pale yellow solid, with less than 5% residual humidity and substantially free from sodium (less than 0.1%).

Example 3: Alternative Procedure for Preparation of K4d Polymer

As an alternative to the process described in Example 1, K4d polysaccharide can be obtained directly by fermentation, using strain DSM23644 which produces a defructosylated polysaccharide. The product is purified as described in WO2012/004063, and acid or radical depolymerisation is performed as described by Cho et al. to obtain the desired molecular weight.

The resulting product is identical to the one obtained according to Example 1; a quaternary ammonium salt can be obtained by operating as described in Example 2.

Example 4 (Comparative): Preparation of Chondroitin Sulfate in DMF Solvent

The reaction is conducted as described in WO2012/159655, example 4, with the difference that the K4d polysaccharide used has a lower molecular weight, of <10 kDa.

A reactor is charged with 72 ml of anhydrous dimethylformamide and 1.20 g of K4d polysaccharide tetrabutylammonium salt, obtained as described in Example 2, 3 equivalents of $SO_3$ DMF complex are added, and the temperature is kept controlled at about +10° C. After completion of the reaction, the reaction is quenched with sodium bicarbonate and dialysed, isolating the product by freeze-drying; chondroitin sulfate sodium with a molecular weight <10 kDa and the sulfation profile reported in WO2012/159655, p. 16, Table 2, is obtained.

Example 5: Preparation of Sulfating Mixture in Acetic Acid

A glass reactor is charged under nitrogen flow with 134 ml of anhydrous DMF, and cooled to 5±5° C.; 67 g of chlorosulfonic acid is dripped in, maintaining the temperature <30° C. A white precipitate forms during the addition; the mixture is maintained under stirring for a further 20 minutes, adjusting the temperature to 5±5° C. The solid is filtered through a sintered glass Buchner funnel, under nitrogen, eliminating the DMF. The solid reagent is dissolved in acetic acid (73.46 g) under magnetic stirring. The resulting sulfating solution is maintained under nitrogen at 4° C., protected against humidity, until the time of use.

Example 6: Preparation of Low-Molecular-Weight Chondroitin Sulfate in Acetic Acid Solvent A glass reactor is charged under nitrogen flow with 200 ml of anhydrous acetic acid and 20 g of K4d polysaccharide tetrabutylammonium salt, obtained as described in Example 2. The resulting suspension is cooled under stirring to about 13° C., treated with the sulfating solution prepared according to Example 5 (40.22 g), and maintained under stirring at the same temperature for 24 hours. The reaction is quenched with 30% NaOH (382 ml) and ice, maintaining the temperature <30° C.; the suspension is adjusted to pH 7.9 with HCl and filtered through a Buchner funnel, and the solid (sodium acetate) is discarded. The mother liquor is ultrafiltered through an ultrafiltration membrane (cut-off 2.5 KDa), dialysing with water. The retentate is concentrated by vacuum evaporation, decolourised with decolourising charcoal and freeze-dried, to obtain 10.5 g of chondroitin sulfate.

Example 7: Preparation of Low-Molecular-Weight Chondroitin Sulfate in Acetic Acid Solvent A glass reactor is charged under nitrogen flow with 200 ml of anhydrous acetic acid and 20 g of K4d polysaccharide tetrabutylammonium salt, obtained as described in Example 2; the suspension is cooled to about 13° C. and the sulfating solution described in Example 5 (40.0 g) is added. After 24 hours, the reaction is quenched with water and ice, maintaining the temperature <30° C.; this is followed by ultrafiltration and dialysis with water, correcting the pH of the retentate to between 5.5 and 7.5. The retentate is concentrated, decolourised with charcoal and freeze-dried; 11.5 g of chondroitin sulfate is obtained.

Example 8: Preparation of Low-Molecular-Weight Chondroitin Sulfate in Acetic Acid Solvent A glass reactor is charged under nitrogen flow with 800 ml of anhydrous acetic acid and 80 g of K4d polysaccharide tetrabutylammonium salt, obtained as described in Example 2. The resulting suspension is heated to about 50° C. under stirring, treated with the sulfating solution prepared according to Example 5 (161.32 g), and maintained under stirring at the same temperature for 1 hour. Part of the suspension (~200 ml) is quenched by pouring it into water and ice (2.5 kg), maintaining the temperature <30° C.; the resulting solution is ultrafiltered through an ultrafiltration membrane (cut-off 2.5 KDa), dialysing with water to a conductivity in the permeate <500 µS and adjusting the pH of the retentate to between 5.5 and 7.5. The retentate is concentrated by evaporation, iced and freeze-dried, to obtain 8.6 g of chondroitin sulfate.

Example 9: Preparation of Low-Molecular-Weight Chondroitin Sulfate in Acetic Acid Solvent with Chlorosulfonic Acid A glass reactor is charged under nitrogen flow with 200 ml of anhydrous acetic acid and 20 g of K4d polysaccharide tetrabutylammonium salt, obtained as described in Example 2; the suspension is cooled to about 13° C. and chlorosulfonic acid (8.95 g) is added, maintaining the temperature for 24 hours. The suspension is then poured into water and ice, ultrafiltered and dialysed as described in Example 7. 12.7 g of chondroitin sulfate is obtained by freeze-drying.

Example 10: Preparation of Low-Molecular-Weight Chondroitin Sulfate in Acetic Acid Solvent with Chlorosulfonic Acid A glass reactor fitted with a mechanical stirrer, thermometer and dropper is charged under nitrogen flow with 600 ml of anhydrous acetic acid and 60 g of K4d polysaccharide tetrabutylammonium salt, obtained as described in Example 2. The resulting suspension is heated to about 50° C. under stirring and treated with chlorosulfonic acid (28.8 g), and maintained under stirring at the same temperature for 10 min. Part of the suspension (~200 ml) is quenched by pouring it into in water and ice (2.5 kg), maintaining the temperature <30° C.; the resulting solution is ultrafiltered through an ultrafiltration membrane, dialysing with water to a conductivity in the permeate <500 µS and adjusting the pH of the retentate to between 5.5 and 7.5. The retentate is concentrated by evaporation, iced and freeze-dried, to obtain 8.64 g of chondroitin sulfate.

Example 11: Preparation of Low-Molecular-Weight Chondroitin Sulfate in Acetic Acid Solvent with Chlorosulfonic Acid The process is conducted as in the previous examples using 200 ml of anhydrous acetic acid, 20 g of K4d polysaccharide salt TBA and 10.54 g of chlorosulfonic acid, conducting the reaction at 10-15° C. for 24 hours. After completion of the reaction the suspension is filtered through a Buchner funnel, and the cake is washed with acetic acid and dissolved in water at pH 7.3 by $Na_2CO_3$ (q.s.). The resulting solution is ultrafiltered and dialysed as described above, and the retentate is freeze-dried to obtain 8.58 g of chondroitin sulfate.

Example 12: Purification of Low-Molecular-Weight Chondroitin Sulfate in Acetic Acid by Precipitation in Ethanol and Water The synthesis is conducted as described in Example 6, and the sodium acetate is removed by filtration at the end of the reaction. The solution is dropped into absolute ethanol under vigorous stirring; the result is a suspension that is filtered through a Buchner funnel to obtain 27.1 g of crude chondroitin sulfate in the form of a vitreous solid. An aliquot of the resulting solid (2.5 g) is dissolved in 0.2M NaCl (7.5 ml), and the solution is then dripped into EtOH (50 ml) under vigorous stirring; pure chondroitin sulfate precipitates in the form of an amorphous solid (2.16 g).

Example 13: Synthesis and Purification of High-Molecular-Weight Chondroitin Sulfate in Acetic Acid The reaction is conducted as described in Example 1 to obtain high-molecular-weight (defructosylated) K4d polysaccharide in aqueous solution; however, depolymerisation is not performed. The corresponding tetrabutylammonium salt is obtained with ion-exchange resin as described in Example 2.

A glass reactor is charged under nitrogen flow with 91 ml of anhydrous acetic acid and 9.1 g of high-molecular-weight K4d polysaccharide TBA salt. The resulting suspension is cooled under stirring to 10-15° C. and treated with chlorosulfonic acid (5.3 g), then maintained under stirring at the same temperature for 2.5 hours. The suspension is filtered through a Buchner funnel and the resulting cake is dissolved in 10% aq. NaHCO$_3$; the resulting solution is ultrafiltered and dialysed through an ultrafiltration membrane. 5.21 g of chondroitin sulfate is obtained by freeze-drying.

Example 14: Synthesis and Purification of Low-Molecular-Weight Chondroitin Sulfate (with DMFSO$_3$ Powder) in Acetic Acid A glass reactor is charged under nitrogen flow with 200 ml of anhydrous acetic acid and 20 g of K4d polysaccharide TBA salt, obtained as described in Example 2. The resulting suspension is heated to about 50° C. under stirring, treated with DMF-SO$_3$ complex (Aldrich, 10.95 g), and maintained under stirring at the same temperature for 1 hour; the reaction is then quenched in ice, followed by ultrafiltration and dialysis, maintaining the pH of the retentate at between 5.5 and 7.5. The product is decolourised with decolourising charcoal and freeze-dried, to obtain 8.73 g of chondroitin sulfate.

The invention claimed is:

1. A process for preparing chondroitin sulfates, said process comprising
reacting chondroitin or salts thereof with a sulfating agent, wherein said reacting step is carried out in acetic acid, under controlled temperature conditions.

2. The process according to claim 1 wherein the sulfating agent is chlorosulfonic acid or a complex of SO3 with an organic base or with dimethylformamide.

3. The process according to claim 2 wherein the organic base is pyridine or triethylamine.

4. The process according to claim 1, wherein the controlled temperature conditions range ranges from freezing point of the reaction mixture to 70° C.

5. The process according to claim 4, wherein the controlled temperature conditions range from 10 to 50° C.

6. The process according to claim 4, wherein the controlled temperature conditions range from 10 to 20° C.

7. The process according to claim 1, wherein the chondroitin is in salt form.

8. The process according to claim 7 wherein the salt is a tetraalkylammonium or pyridinium salt.

9. The process according to claim 1, for the preparation of low-molecular-weight chondroitin sulfate sodium salt.

10. The process according to claim 1, wherein the sulfation product is isolated by filtration, precipitation in organic solvent or chromatography, optionally after removal of organic or inorganic salts by dialysis.

* * * * *